April 14, 1931. R. P. DE VAULT 1,800,211
LIGHT RAY PROJECTION APPARATUS
Filed Nov. 14, 1922  3 Sheets-Sheet 1
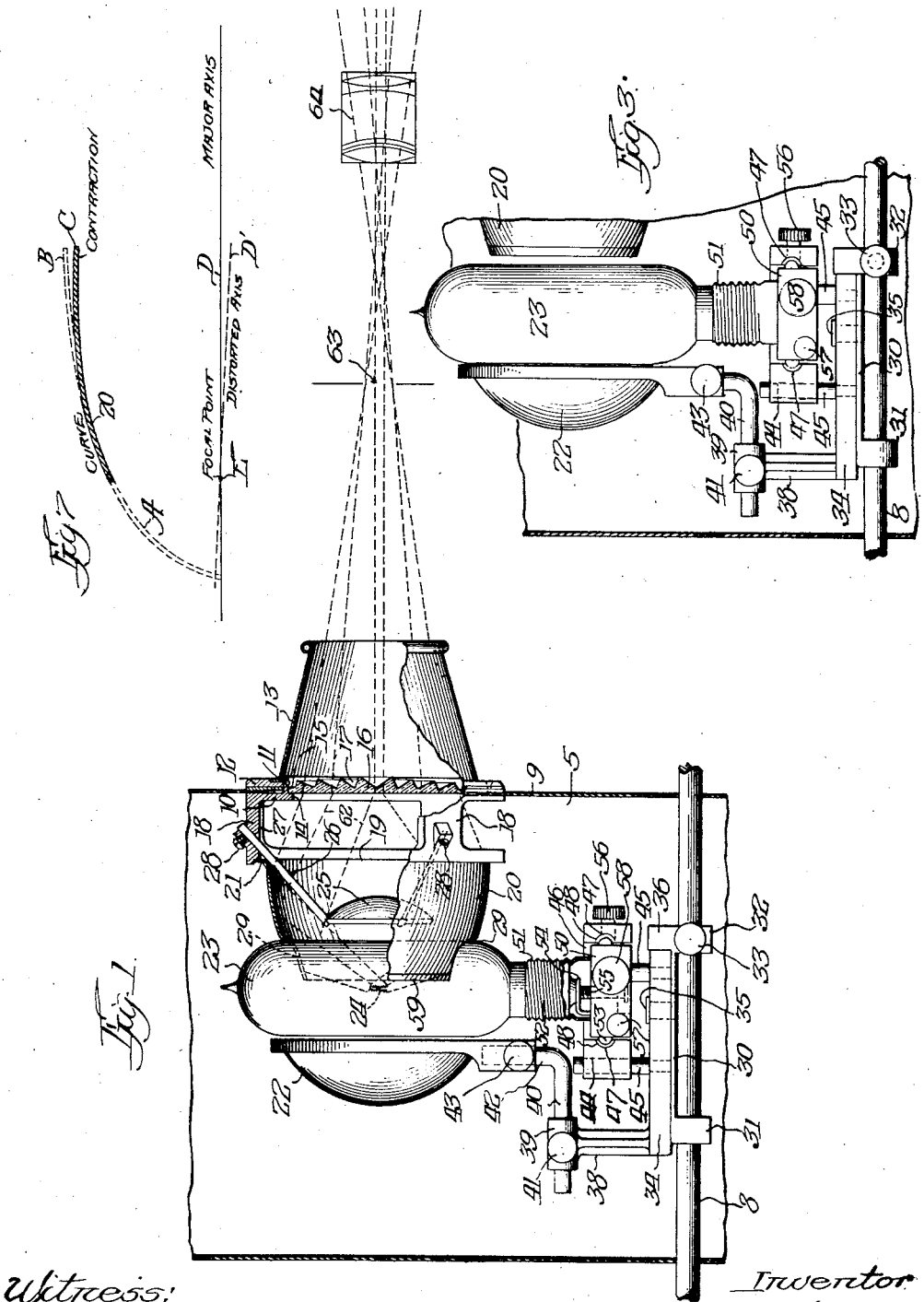

April 14, 1931.  R. P. DE VAULT  1,800,211
LIGHT RAY PROJECTION APPARATUS
Filed Nov. 14, 1922   3 Sheets-Sheet 2
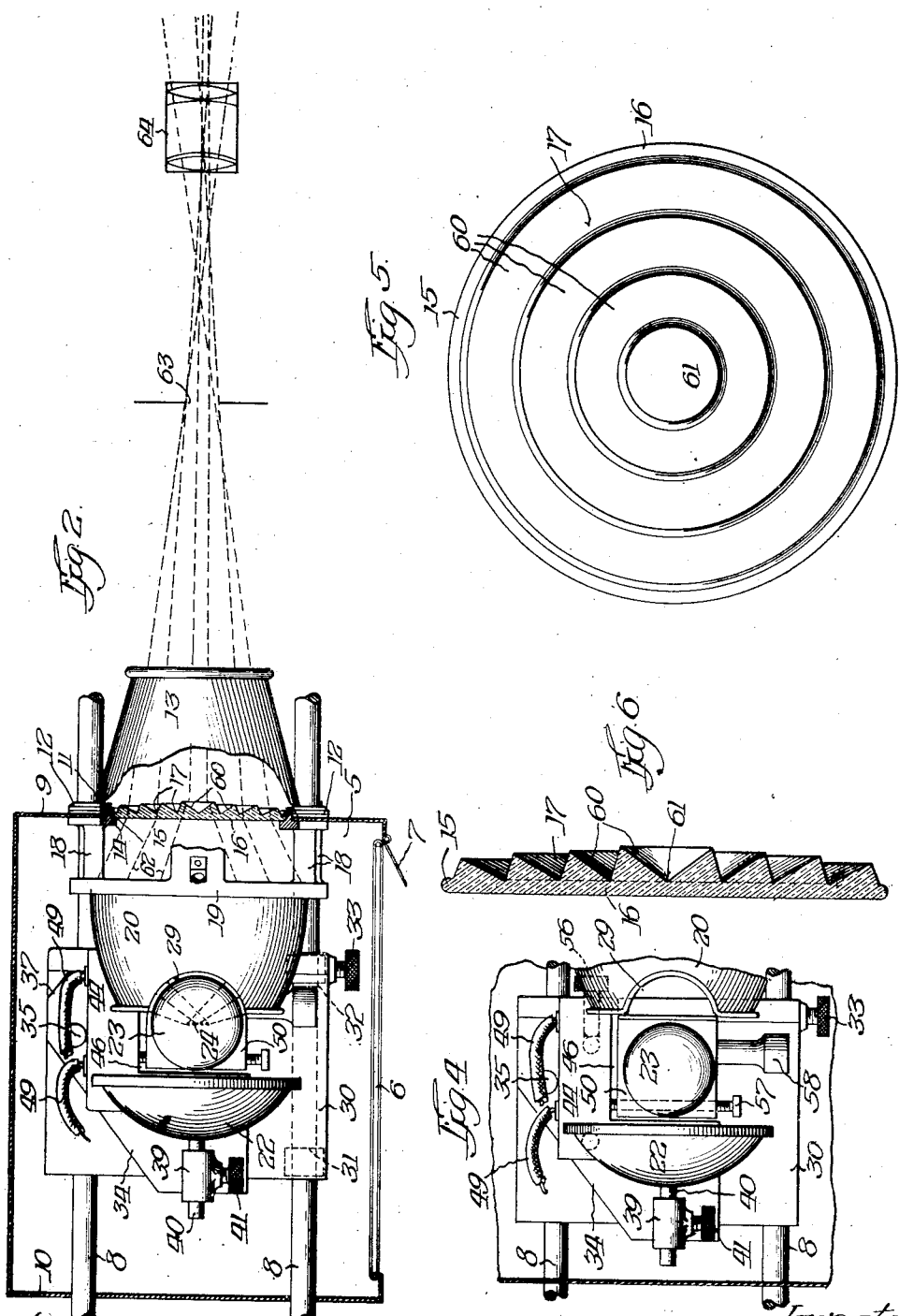

April 14, 1931. R. P. DE VAULT 1,800,211
LIGHT RAY PROJECTION APPARATUS
Filed Nov. 14, 1922 3 Sheets-Sheet 3
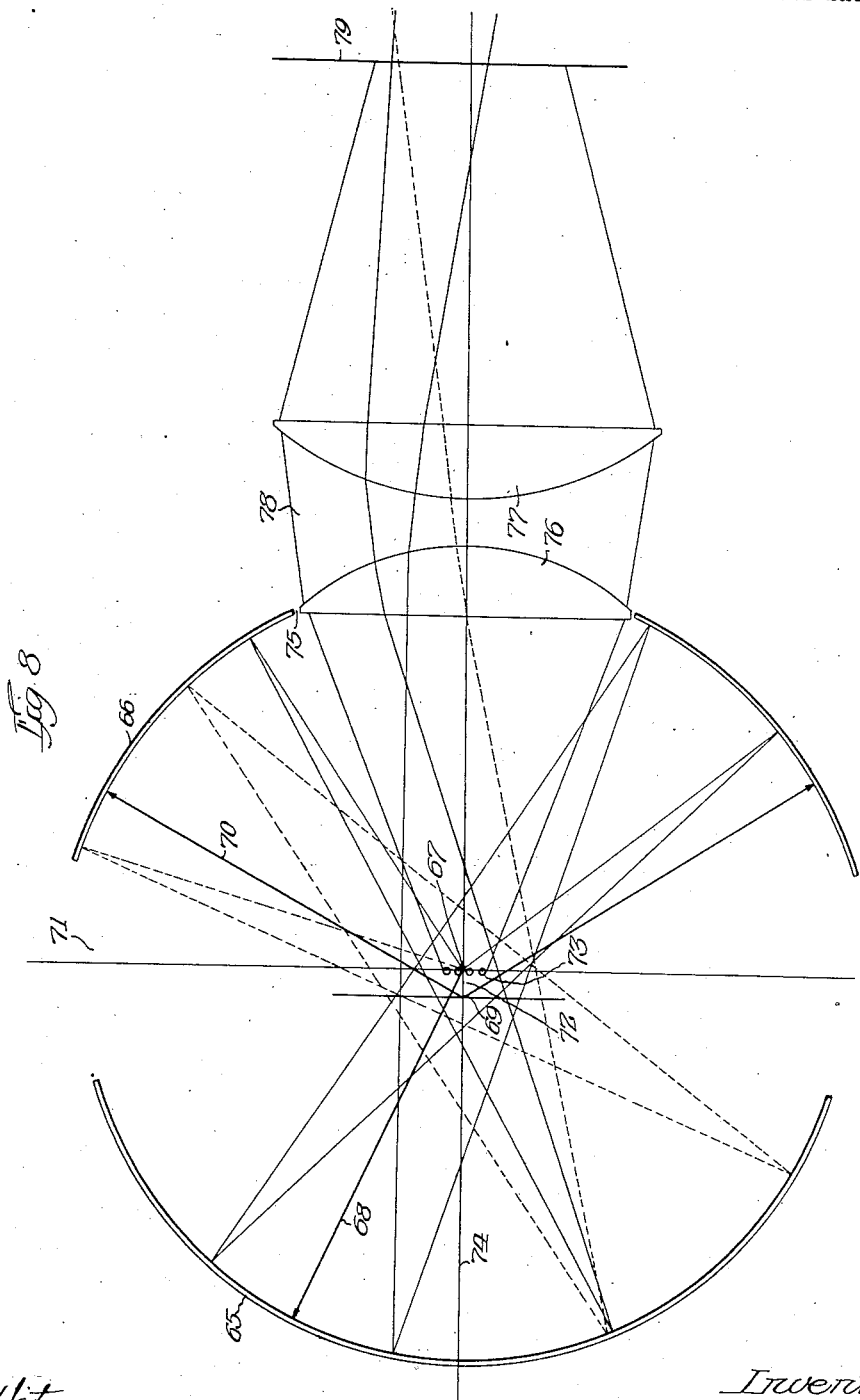
Witness:
Inventor
Ralph P. DeVault Patented Apr. 14, 1931

1,800,211

UNITED STATES PATENT OFFICE

RALPH P. DE VAULT, OF CHICAGO, ILLINOIS, ASSIGNOR, BY MESNE ASSIGNMENTS, TO ACME MOTION PICTURE PROJECTOR COMPANY, OF CHICAGO, ILLINOIS, A CORPORATION OF ILLINOIS

LIGHT-RAY-PROJECTION APPARATUS

Application filed November 14, 1922. Serial No. 600,974.

This invention relates broadly to the projection of light rays, and pertains to the projection of light rays from a centralized or other artificial source of light, more particularly to the attainment of improved projection of light rays for employment in motion picture projecting apparatus.

While this invention is illustrated and described more particularly as a motion picture projecting apparatus, it will be understood that it is not contemplated that the invention be limited to this adaptation, but finds a wide field of utility for other purposes.

The principal objects and advantages which characterize this invention are expressed in the provision of improved means for projecting light rays, the provision of improved means for projecting light rays from a centralized source of light; the provision of improved means for projecting light rays in substantially parallel lines; the provision of improved means for increasing the intensity of light projected from a source of light of predetermined intensity; the provision of improved means for collecting and projecting light rays from a source of light indirectly situated with respect to an objective; the provision of means for projecting light coming on in the form of a converging cone of rays into a substantially cylindrical form; the provision of means for projecting converging light rays into substantially parallel planes; the provision of means for projecting light coming on in the form of converging cone or cones of rays into concentric substantially cylindrical forms; and the provision of improved means for indirectly collecting and directly projecting light rays from a centralized source of light.

This invention is further and more specifically characterized by the provision of an improved arrangement of reflecting surfaces for projecting light rays; the provision of an improved variable arrangement of reflecting surfaces for projecting light rays; the provision of an improved arrangement of reflecting surfaces for projecting light rays from a light source substantially encompassed by said surfaces; the provision of an improved arrangement of reflecting surfaces and lens or lenses for projecting light rays in substantially parallel relationship; the provision of an improved arrangement of reflecting surfaces and lens or lenses for projecting light rays in a substantially cylindrical form or plurality of concentric cylindrical forms; the provision of an improved arrangement of reflecting surfaces and a lens for projecting light rays first in the form of a converging cone and for reducing said rays to substantially cylindrical form; and the provision of an improved arrangement of reflecting surfaces so related to a source of light that no direct rays extend therefrom into the trajectory of projected rays.

This invention is still further specifically characterized by the provision of an improved construction and arrangement of reflecting surfaces for projecting light rays; the provision of an improved form of reflector for projecting light rays characterized by the provision of a surface which is a portion or frustum of substantially an ellipsoid; the provision of an improved reflector for light rays which is characterized by a form substantially frusto-elliptical; the provision of an improved form of reflector which embodies a reflecting surface characterized by a curve generated by the revolution of an elliptical arc about an axis which is angularly related to the major axis of the elliptical arc; the provision of an improved reflector characterized by the embodiment of a reflecting surface generated by the revolution of an elliptical arc about an axis which is oblique to the major axis of the arc; the provision of improved light projecting means characterized by the presence of a reflecting surface generated by the revolution of an elliptical arc about an axis which is oblique to the major axis of the arc and the combination therewith of a source of light transversely to the axis of rotation; the provision of an improved lens having a surface provided with a series of concentric grooves; the provision of an improved lens, one surface of which is provided with a series of concentric substantially V-shaped grooves, certain walls of each of such grooves being curved and at a greater degree of angularity to the axis of the lens than the other walls of said grooves; the provision of an improved lens for projecting light from a source characterized by the presence of a reflecting surface generated by the revolution of an elliptical arc about an axis which is oblique to the major axis of the arc, and in which the axis of revolution is transverse to the plane of the source of light, in combination with a lens adapted to project the light coming on in the form of a converging cone of rays into a substantially cylindrical form; the provision of improved means for adjusting the relative positions of the light source, elliptical reflector and lens; the provision of an embodiment of reflectors whereby the intensity of light rays projected from a source of light may be increased beyond that value heretofore attainable, with a consequent reduction in power required; and the embodiment of the foregoing elements with their advantageous features in a structure which is simple, compact, efficient in operation and capable of production at low cost.

The foregoing, and such other objects and advantages as may appear or be pointed out as this description proceeds, are attainable with one structural arrangement, this being illustrated in the accompanying drawings, in which:

Figure 1 is a fragmentary side elevational view of the device of this invention, together with certain conventional associated parts;

Figure 2 is a fragmentary top plan view of the same;

Figures 3 and 4 are enlarged fragmentary side elevational and top plan views, respectively, serving to illustrate an adjustable feature of this invention;

Figure 5 is a front elevational view of an improved form of lens;

Figure 6 is a transverse sectional view of said improved lens;

Figure 7 is a diagrammatic view of the manner of production of my improved reflector; and Figure 8 is a semi-diagrammatic sectional view of a further modified form of this invention.

Referring more particularly to the drawing and first to Figures 1 to 4 inclusive I provide the lamp house 5, which is substantially rectangular in horizontal cross section as shown in Figure 2, said lamp house having a side opening 6, to be closed by a hinged door 7. A pair of spaced supporting rods 8 extend through the front and rear walls 9 and 10, respectively, of the lamp house and serve to support the source of light adjustably as will hereinafter appear.

The front wall 9 is provided with a substantially circular opening bordered by the reflector support 10 arranged fixedly on the inner surface of the wall 9, and having an annular flange 11 which projects through the opening in said front wall. An annular plate 12 is arranged externally of the wall 9, about the opening therein, and said plate engages the flange 11, suitable retaining means (not shown) passing through the plate 12 and the reflector support 10 for adjustably attaching the ring and support to the front wall of the housing. The ring 12 carries a projecting substantially conical removable shield 13, which projects axially beyond the wall 9.

The reflector support 10 is provided with an annular flange 14 which, with the flange 11, forms an annular seat for receiving the peripheral edge 15 of the lens 16, such lens being provided with concentric grooves 17 arranged in a relationship and having a shape which will be more specifically described hereinafter. The reflector support 10 is provided with a plurality of webs 18, circumferentially arranged and carrying at their rear ends the reflector supporting ring 19, the substantially frusto-elliptical reflector 20, constructed as hereinafter described, being secured by an angular flange 21 to said ring. A major or primary reflector 22 preferably parti-spherical is supported to the rear of the source of light which, in this case, is an incandescent lamp 23 provided with a filament 24, and a minor or secondary reflector 25 preferably parti-spherical is arranged in front of the light source and supported within the reflector 20, and axially thereof, by a plurality of radially arranged inclined arms 26, the outer ends of said arms being secured in apertures 27 in the webs 18 and retained against displacement therefrom by set screws 28. The reflector 20, which is the tertiary reflector and is a section or frustum of a substantially ellipsoidal figure, is provided with substantially semi-circular recesses 29 for accommodation of the lamp 23 in a predetermined relationship to the reflector 20, for a purpose which will hereinafter appear, and it will be seen from Figures 1 and 2 that the lens 16, primary and secondary reflectors 22 and 25 respectively, tertiary reflector 20, and lamp filament 24 are all arranged with their respective axes coincident.

It is desirable that the reflector 22 and the lamp 23 be relatively adjustable and also adjustable relatively to the frusto-elliptical reflector and secondary reflector 25, and to this end I provide a special structure, which, of course, in its specific details, may be modified as desired within reasonable limits. This adjustable supporting means here comprises a slidable base 30 disposed above the supporting rods 8, and connected thereto by aligned apertured lugs 31 and 32, one of the lugs of those designated 32 being provided with a transverse set screw 33 which may be manipulated to impinge upon the adjacent rod for arresting movement of the base plate 30 thereon.

Upon the upper surface of the base 30 there is mounted a swinging table in the form of a base member 34 pivoted at 35 to the base 30 and adapted for horizontal swinging movement on said base 30, the front portion or edge of the carriage 34 abutting an upstanding flange 36 formed on the forward end of the base plate 30. A portion of the carriage 34 is cut away as at 37 to permit of its swinging on the pivot 35. The plate 34 is held against displacement from the position shown by the head of the rivet 35 and the frictional contact between the under side of the table 34 and the top face of the base plate 30. A bracket 38 extends upwardly from the rear edge of the carriage 34 and is provided with an integral sleeve 39 through which the supporting arm 40 passes, a set screw 41 retaining said arm 40 in its desired position, the forward end of the arm 40 being bent upwardly to form a standard 42 which vertically adjustably carries the reflector 22, a set screw 43 securing the reflector in adjusted position. In the normal position of the reflector 22, it is disposed directly to the rear of the light source and therefore is relatively close to the lamp bulb 23.

The lamp is removable and adjustably supported in an insulating block 44 which latter is adjustably mounted on posts 45—45 which latter extend upwardly over the carriage 34. The block 44 is provided with a recess 46, said recess opening at one side of the block 44, preferably the right side of the apparatus, that is, that side to the right when looking forward or in the direction in which the light rays are projected. The recess 46 is provided with grooves 47—47, one each in the parallel vertical walls of the recess, metallic channels 48—48 being disposed each one for each groove. The metallic channels 48 are connected each to one of the conductors 49—49 which supply electric current to the lamp. The lamp is directly supported by a transversely adjustable carriage block 50 of insulating material, said block 50 carrying the screw threaded lamp socket 51 which receives the screw threaded base 52 of the lamp bulb. The socket 51 is connected to either one of the metallic shoulders 53 which seat in the channels 48, and a spring terminal 54 connects to the other of said shoulders so that the circuit is completed to the lamp. For the purpose of adjustment an axial screw 55 extends through the carriage block 50 and engages beneath the terminal 54 so that the position of said terminal relative the lamp base may be varied; in other words, the distance to which the lamp is screwed into its socket may be regulated as found necessary. The purpose of this will appear later. The carriage 50 is transversely slidable in the recess 46, relative the rods 8 and relative the trajectory of the projected rays. The block 44 is held in various vertically adjusted positions by a set screw 56. A limit screw 57 is arranged longitudinally in the block 50 and is adapted to abut the inner wall of the recess 46 for limiting the movement of the carriage block in one direction. A handle 58 is provided on the block 50 for moving the latter when adjusting same. The entire lamp assembly is thus removable for quick replacement in case the filament burns out.

From the foregoing it will be seen that the lamp 23 is substantially universally adjustable relative the system of reflectors, that is, the lamp may be adjusted relative the reflectors 20 and 25, and the reflector 22 may be adjusted relatively to the lamp. The lamp is transversely adjustable through the means afforded by the slidable block 50, and is vertically adjustable by virtue of the arrangement of the terminal 54, and said lamp is longitudinally adjustable or movable relative to the front or rear by the mounting of the base plate 30 on the rod 8. This is an extremely important and advantageous feature in this invention, as it is highly desirable that the source of light, that is, the lamp filament 24, be in its proper relationship to the reflectors in order that the best results may be obtained. The manner of adjusting and the relative positions can be best seen from Figures 3 and 4, the lamp being there shown removed from the reflector 20 so that the operator may adjust the lamp laterally or vertically, or may remove the lamp for replacement where necessary without disturbing any adjustment of the reflectors whatsoever. The provision of the screw 55 affords the accurate disposition of the lamp in its socket so that the filament of the lamp, which in this instance is substantially square and preferably disposed transversely to the axis of the deflector 20, may be properly positioned. It will be observed from Figures 1 and 2 that the lamp filament is disposed in such relation to the axis of the device that this axis passed through the center of the filament.

The reflector 20 is made with a peculiar shape imparted to the curved surface thereof, and while the reflector presents a substantially frusto-elliptical form in longitudinal cross section, it is not the true arc of an ellipse, but, as shown in Figure 7, the curve of the reflector 20 is obtained by revolving an elliptical arc about an axis which is oblique to the major axis of the ellipse or, in other words, the elliptical arc. In Figure 7, 20 is a portion of the reflector and it will be seen that the curvature, for a short distance, follows the curve of a normal ellipse, but due to the fact that the curve has been generated about the distorted axis, this curve falls away from or results in a contraction of one end of the curve. The dotted lines A—B in Figure 7 indicate a substantially true elliptical curve and it will be seen that the end C of the reflector 20 is contracted towards the major axis D of the curve A—B. This is accomplished by projection of the curve upon the axis D' which is oblique to the major axis D and passes through one of the foci E of the ellipse. By this formation of reflector a highly efficient collection, transmission, and centralization of light rays is obtainable, especially when employed in connection with the lamp filament described. It will be seen that the reflector 20 acts somewhat in the nature of a chute which tends to gather the light rays, and as the rays of light from the light source or filament 24 strike the surface of the reflector 20 from the rear, these rays will naturally be conveyed and projected with intensity upon the lens 16. The recesses 29 are provided in the reflector 20 because it is highly important that the distance between the rear edge 59 of the reflector 20 and a transverse line drawn through the lamp filament be proper to attain the results. While the following figures are not to be considered as fixed I submit them as exemplary of one arrangement which is found to be practicable in so far as measurements are concerned. I take an arc 3½ inches long of an ellipse having a focal length of 30 inches and I revolve this arc on an oblique axis which is displaced relative the major axis of the ellipse substantially 19½°, the effect of which is to attain the contraction of the reflector, as shown in Figure 7. This is, of course, a contraction of the front of the reflector, or that end remote from the light source. The intersection of the displaced axis D' and the major axis D is preferably approximately coincident with or not to exceed one inch in front of the center of the filament 24 or other centralized source of light. As further exemplary of the manner of arriving at the curvature of the surface of the reflector 20 the following is in point: there is a curved surface which is a portion of the smaller nap of a surface whose equation is $$x^2+y^2+Z^2-(x^2\cos^2\theta+(y^2+Z^2)\sin^2\theta+2x\sqrt{y^2+Z^2}\sin\theta\cos\theta)e^2+(c^2+2cx\cos\theta+2c\sqrt{y^2+Z^2}\sin\theta)(1-e^2)=a^2(1-e^2),$$

where $a$, $c$, $e$ are numerical constants and $\theta$ is an angle.

The lens 16 is provided with grooves 17, said grooves being concentric and having the faces or walls 60—60 thereof curved, the center of the curves being drawn from a point located to the rear of the lens in its normal position in the device. The points from which these curved surfaces 60 are drawn are located in the lens here shown approximately 4.875 inches from the axis of the lens, and a line drawn through said points intersects the axis of the lens at a point substantially 6.024 inches from the bottom of the central groove 61, which latter groove is in actuality a true conical recess. This lens is located about 5½ inches from the plane of the filament. The effect of this arrangement is the reflection of the rays from the reflectors 25 and 22 to the reflector 20, thence the projection of the rays onto and through the lens 16, and as seen in Figures 1 and 2 the rays indicated by the dotted line 62 come on or are projected onto the lens in the form of a converging cone, and due to the curved surfaces 60 of the grooves in said lens the rays are deflected or refracted and projected from said lens in a substantially cylindrical form or concentric series of cylindrical forms, whence they pass through the film aperture 63, through which the picture is exposed and then through the condensing or projection lens 64 to the objective, which latter may be the usual motion picture screen. The film aperture 63 is preferably located about 11 inches from the refractory lens 16.

Referring now to Figure 8, there is here illustrated an alternative form of the present invention embodying improvements in an arrangement of reflectors whereby substantially all of the rays of light may be extracted from a light source, and when this device is employed either in its entirety as shown, or in conjunction with the lens previously described, it materially enhances the attainable efficiency of light projection.

This device involves broadly the positioning of a light source between two opposed hemispherical or other concavo-convex reflectors, the light source being situated at a point between the respective centers about which said reflectors are described, the radii of said reflectors overlapping, so that the source of light is disposed in an area defined by such overlapping radii.

While not essential, it is desirable that the curvatures of the two reflectors be dissimilar, that is, described by radii of different lengths, as shown.

In structurally carrying out this form of the invention, I provide the two reflectors 65 and 66, made each in the form of concavo-convex hemispheres, and arranged as shown coaxially in spaced relationship. For the purpose of convenience in describing, the reflector 65 is termed the rear reflector, and 66 the front reflector. The rear reflector is described about a center 67 on a radius 68, and the front reflector is described about the center 69 on a radius 70, which is of a length greater than that of the radius 68. Thus the span of the front reflector is greater than that of the rear reflector.

The reflectors are so positioned that a peripheral space is afforded between them, and so that their respective radii overlap. In the area 72 defined by such overlapping radii, the source 73 of light is placed. This source of light is similar to that shown in Figure 7 and is in a plane transversely disposed with respect to the longitudinal axis 74 of the device. The light source 73 may be adjusted toward or away from either of the reflectors along the axis 74 or transversely thereof by mounting the light source on a structure similar to that of Figures 1 to 4, inclusive. Thus, the light source may be disposed at one or the other of the centers 67 or 69 or between them, as found most satisfactory. I find that satisfactory results are attained by positioning the light source as shown in Figure 8.

The front reflector is provided with an axial aperture 75, through which the light rays from the source 73 pass into and through the lenses 76 and 77 of a condensing device 78, whence the condensed rays issue through the shield 79 through a picture onto a screen, when used in projection of motion pictures.

It will be observed that the device of Figure 8 is readily adaptable for use in conjunction with or as alternative to the structures shown in Figures 1 to 6, inclusive, and that the reflectors 65 and 66, light source 73, condensing device 78 and shield 79 are all capable of relative adjustment by the provision therewith of the various adjustable supports already described. I am thus enabled to provide a device of wide utility possessing high efficiency, and capable of required adjustments in use.

It will be observed that in the operation of the device shown in Figure 8 the light rays issuing from the light source shown, which, as previously pointed out, is preferably flat and transversely arranged to the axis of the device, will reflect from the front to the rear reflector, thence through the aperture provided in said front reflector and through the condensing device. No light rays can escape through the side or peripheral space between the reflectors owing to their arrangement.

With the arrangement of reflectors and lens hereinbefore described I am enabled to extract or collect a greater number of rays from a lamp of a given size and wattage than has heretofore been possible, and in this way I am enabled to reduce the power required for projecting light at the required intensity for motion picture work.

Having thus described my invention and illustrated its use, what I claim as new and desire to secure by Letters Patent is:—

1. In a device of the character described, in combination, a reflecting surface generated by the revolution of an elliptical arc about an axis which is oblique to the major axis of the arc, a source of light characterized by a light filament arranged transversely to the axis of rotation, means for projecting such light in the form of a converging cone of rays and a lens provided with angularly related surfaces adapted to project the light coming on in the form of a converging cone of rays, into a beam having a portion thereof in a substantially cylindrical form.

2. In an optical system for projecting light, the combination of a source of light, a frontal reflector and a rear reflector disposed to each side of said source of light of parti-spherical continuous contour, the radius of the frontal reflector, being less than the radius of the rear reflector, the reflectors being arranged for being positioned relatively to each other with the centers overlapping and the light sources disposed within the area of said overlapping centers, and a light ray collecting and conveying reflector axially arranged on the trajectory of a projected beam, and substantially encompassing the frontal reflector comprising a distorted frusto-ellipsoid, the section of said frusto-ellipsoid being less than the rear parti-spherical reflector whereby rays from said rear reflector may be reflected from said ray conveying and collecting reflector.

3. In a device of the character described, in combination, a reflecting surface generated by the revolution of an elliptical arc about an axis which is oblique to the major axis of the arc, a source of light characterized by a light filament arranged transversely to the axis of rotation, means for projecting such light comprising a spherical reflector on one side of said source of light, a second spherical reflector on the other side of said source of light for projecting the light in the form of a converging cone of rays, and a lens provided with angularly related surfaces adapted to project the light coming on in the form of a converging cone of rays into a beam having a portion thereof in a substantially cylindrical form.

4. In a device of the character described, in combination, a reflecting surface generated by the revolution of an elliptical arc about an axis which is oblique to the major axis of the arc, a source of light characterized by a light filament arranged transversely to the axis of rotation, means for projecting such light comprising a spherical reflector on one side of said source of light, a second spherical reflector on the other side of said source of light for projecting the light in the form of a converging cone or rays, a third ray collecting frusto-spherical reflector encompassing said second spherical reflector and lens located beyond said frusto-spherical reflector, said lens having angularly related surfaces adapted to project the light in a beam having a portion thereof substantially cylindrical.

In testimony whereof I have hereunto signed my name.

RALPH P. DE VAULT.